US006748860B2

(12) United States Patent
Löffler et al.

(10) Patent No.: US 6,748,860 B2
(45) Date of Patent: Jun. 15, 2004

(54) OPERATING PANEL FOR A PRINTING MACHINE, INKING CONTROL SYSTEM FOR A PRINTING MACHINE, AND INKING CONTROL METHOD

(75) Inventors: Gerhard Löffler, Walldorf (DE); Roland Pudimat, Eberbach (DE)

(73) Assignee: Heidelberger Druckmaschinen AG, Heidelberg (DE)

( * ) Notice: Subject to any disclaimer, the term of this patent is extended or adjusted under 35 U.S.C. 154(b) by 0 days.

(21) Appl. No.: 10/328,772

(22) Filed: Dec. 23, 2002

(65) Prior Publication Data

US 2003/0101884 A1 Jun. 5, 2003

Related U.S. Application Data

(63) Continuation-in-part of application No. 08/422,456, filed on Apr. 17, 1995, now abandoned.

(30) Foreign Application Priority Data

Apr. 15, 1994 (DE) ........................................ 44 13 230

(51) Int. Cl.[7] ........................ B41F 31/00; H04N 1/40; H04N 1/46; H04N 7/18

(52) U.S. Cl. ..................... 101/365; 382/112; 345/589; 345/970

(58) Field of Search .............................. 101/365, 484, 101/DIG. 47; 382/112, 167; 356/406, 407; 348/61, 650, 778, 840; 345/589, 765, 970

(56) References Cited

U.S. PATENT DOCUMENTS

| | | | |
|---|---|---|---|
| 3,930,447 A | 1/1976 | Murray | 101/365 |
| 4,639,776 A | 1/1987 | Foerster et al. | 348/61 |

(List continued on next page.)

FOREIGN PATENT DOCUMENTS

| | | |
|---|---|---|
| DE | 33 25 006 A1 | 6/1984 |
| DE | 38 26 385 A1 | 2/1990 |
| DE | 39 24 989 A1 | 2/1991 |
| EP | 0 143 744 B1 | 1/1988 |
| EP | 0 410 253 A2 | 1/1991 |
| EP | 0 527 407 A1 B1 | 2/1993 |
| GB | 1 569 961 | 6/1980 |
| JP | 3-27945 | 2/1991 |

OTHER PUBLICATIONS

R. Suding: "Low–Cost Mapping Scanner", IBM Technical Disclosure Bulletin, vol. 19, No. 3, Aug. 1976, p. 815.

*Primary Examiner*—Stephen R. Funk
(74) *Attorney, Agent, or Firm*—Laurence A. Greenberg; Werner H. Stemer; Gregory L. Mayback

(57) ABSTRACT

An inking control system for a printing machine has an operating panel with operating and display elements for adjusting the zonally acting ink distribution devices in the printing machine. A spacing distribution along a given direction and a number of the operating and display elements corresponds to a spacing distribution and a number of the ink zones in the printing machine. A full size color monitor is integrated in the operating panel. The color monitor is enabled to display a full-size printed image on a scale of 1:1 and to spatially correlate the display of the printed image with the operating and display elements to directly visually associate the inking zones in the displayed printed image with the operating and display elements. One or more image recording devices in the printing machine record printed images while the printing material is conveyed through the printing machine. The acquired image data are forwarded to a computer that is connected to the ink distribution devices and to the one or more image recording devices. In the method, the display image for the screen is generated from a sequence of successive scans by the image recording device.

8 Claims, 4 Drawing Sheets

U.S. PATENT DOCUMENTS 4,639,881 A 1/1987 Zingher .................... 345/839
4,977,832 A 12/1990 Walter ..................... 101/365
5,029,527 A 7/1991 Jeschke et al. ............ 101/365
5,163,012 A 11/1992 Wuhrl et al. .............. 382/112
5,724,437 A * 3/1998 Bucher et al. ............ 382/112
5,767,980 A * 6/1998 Wang et al. ............... 358/475
6,009,808 A * 1/2000 Loffler ..................... 101/211
6,343,548 B1 * 2/2002 Bayer et al. .............. 101/232
6,382,101 B1 * 5/2002 Richards ................... 101/365
6,427,591 B1 * 8/2002 Schmid .................. 101/351.8
6,606,949 B1 * 8/2003 Funabashi ................. 101/491

* cited by examiner

OPERATING PANEL FOR A PRINTING MACHINE, INKING CONTROL SYSTEM FOR A PRINTING MACHINE, AND INKING CONTROL METHOD

CROSS-REFERENCE TO RELATED APPLICATION

This is a continuation-in-part of copending application Ser. No. 08/422,456, filed Apr. 17, 1995, now abandoned.

BACKGROUND OF THE INVENTION

FIELD OF THE INVENTION

The invention lies in the printing technology field. More specifically, the invention relates to an operating panel for a printing machine, a control system for controlling inking in a printing machine with such an operating panel, and a control method.

Operating panels for printing machines formed with a support surface for printed sheets which are to be inspected have become known heretofore. The respective printed sheet to be inspected may be positioned on the deposit surface by adjustable stop bars and locking elements so that it is in linear alignment with an ink zone keyboard, the ink zones on the printed sheet corresponding to ink keys assigned thereto, the ink keys being arranged in the operating panel in accordance with the number of ink zones and the respective distance therebetween. The amount of ink, i.e., the ink distribution, is controlled by the ink keys, the ink distribution being adjusted in a printing unit and on the printed sheet transversely with respect to the conveying direction by means of zonally active ink-metering elements. For the purpose of aligning printed sheets with respect to the ink zones, the deposit surface may be provided with markings defining the limits of the ink zones.

Such an alignment is not exact because it depends upon the diligence and expertise of the operating personnel. Furthermore, at least some of the markings are covered when a printed sheet is being inspected so that only the markings, which have not been covered by the respective printed sheet may be used for the inspection. Especially in the case of printing motifs or subjects with stripe-shaped elements running towards the ink zones or transversely thereto, orientation based upon the ink zones is difficult.

Linear display elements may be provided in addition to the ink-zone keyboard, the display elements representing the positions of ink-metering elements within the printing machine.

It is furthermore known to provide the operating panel with a viewing screen or monitor connected to a computer. Among other things, the adjusting variables for metering the ink and/or dampening medium are able to be displayed on the viewing screen. Also known heretofore is the representation on the viewing screen of a photograph of a print taken by means of a camera. A disadvantage thereof is that a conventional viewing screen displays only a respective print which is reduced in size, due to which the visual evaluation for controlling the ink-metering elements is rendered more difficult. Furthermore, the viewing screen is usually located remote from the ink-zone keyboard so that the display on the viewing screen is not very suitable for both the simultaneous comparative evaluation of the printed image and the adjustment of the ink-metering elements.

SUMMARY OF THE INVENTION

It is accordingly an object of the invention to provide an inking control system and an inking control method which overcomes the disadvantages associated with the prior art and which utilizes an operating panel and an image-recording device for a printing machine that permit better handling than afforded by heretofore known systems.

With the foregoing and other objects in view, there is provided, in accordance with the invention, an inking control system for a printing machine having defined ink zones and zonally acting ink distribution devices, the control system comprising:

an operating panel with operating and display elements for adjusting the zonally acting ink distribution devices in the printing machine;

a spacing distribution along a given direction and a number of the operating and display elements corresponding to a spacing distribution and a number of the ink zones;

a color monitor integrated in the operating panel, the color monitor having a size configured to display a printed image on a scale of 1:1 and to a full extent thereof, and to spatially correlate a display of the printed image with regard to the inking zones with the operating and display elements, so that there is a direct visual association between the inking zones in the displayed printed image and the operating and display elements;

at least one image recording device disposed in the printing machine and aimed to record printed images while a printing material is conveyed through the printing machine; and a computer connected to the ink distribution devices and to the at least one image recording device.

In accordance with an added feature of the invention, the computer is integrated in an operating console that has the operating panel.

In accordance with an additional feature of the invention, the image recording device is movably disposed to and fro transversely with respect to a conveying direction of the printing material.

In accordance with another feature of the invention, the color monitor has a display screen arranged in a common plane with the operating and display elements.

With the above and other objects in view there is also provided, in accordance with the invention, a method of controlling the inking process in a printing machine. The method comprises the following steps:

acquiring image data representing a printed image from a printing material with an image recording device disposed in the printing machine;

feeding the image data to a computer;

generating display information from the image data originating from a plurality of successively printed images and produced by the image recording device; and displaying the display information representing the printed image on a color monitor disposed in an operating panel of the printing machine, in a size corresponding to original dimensions of the printed image on the printing material.

In accordance with again an additional feature of the invention, the image recording device is moved to and fro transversely to a conveying direction of the printing material during a passage of a plurality of printed images by the image recording device. In a preferred embodiment, the image recording device is moved to and fro with a period that is greater than a passage time of a printed image underneath the image recording device.

In accordance with a concomitant feature of the invention, the image data are obtained with the image recording device along a scanning line over a plurality of printed images.

There is thus provided an operating panel for a printing machine having operating and display elements for adjusting zonally active ink-distribution devices installed in the printing machine for controlling ink feeding in a printed image. The operating and display elements are arranged in one direction and gaps therebetween correspond in number to those of ink zones wherein the ink feeding is controlled. A color screen has a size adequate for displaying a printed image substantially fullscale or 1:1, and the display of the printed image is directly assignable visually to the operating and display elements.

In accordance with another feature of the invention, the display elements, in addition to the printed image, are displayable on the color screen substantially fullscale.

In accordance with a further feature of the invention, the operating elements, in addition to the printed image, are displayable on the color screen substantially fullscale, and a cursor control device is provided, by means of which the operating elements are actuatable under computer control.

In accordance with an added feature of the invention, the operating panel includes an inspection device for at least one printed product arranged so as to be directly assignable visually to the full-scale display of the printed image with respect to the position and direction of the ink zones.

In accordance with an additional feature of the invention, defining limits of the ink zones are displayable on the color screen.

In accordance with a concomitant feature of the invention, reference image sections and actual image sections are displayable on the color screen.

Thus, the object of the invention is achieved by providing an operating panel comprising a color screen on which a printed image is displayed on a 1:1 scale. The color screen and zonally distributed operating and display elements are arranged relative to one another so that a visually direct assignability is provided.

The size of the color screen permits a display of the printed image at least partially within the area of at least one ink zone with respect to the largest format to be printed on a respective printing machine.

It is economical or cost-advantageous to integrate the display elements representing the position of zonal ink-distributing devices into the color screen so that the use of separate display elements can be dispensed with. It is appropriate to divide the display area of the color screen into two windows, the first window displaying a full-scale printed image, and the second window, which is directly adjacent to the first window, representing the display elements graphically and/or alphanumerically.

According to a modified embodiment of the invention, the operating elements, by means of which the ink-distribution devices are set, are also represented in the second window. The operating elements may be actuated by means of a cursor control device, a light pen, or a touch-screen method. For this purpose, a computer which has a controlling function is assigned to the operating panel.

The color screen may be integrated into the conventional deposit or table-like surface; in addition, an inspection device may be provided to inspect the printed products. The ink zones of the printed products of the inspection device may be arranged in the same direction as are the ink zones on the color screen, that direction being predetermined by the ink zones on the color screen and/or the arrangement of the operating and display elements.

It is advantageous to also represent on the color screen, at the bottom of the printed image or in the printed image itself, the limits of the ink zones on a scale of 1:1. Fine lines drawn in bright colors may be superimposed upon the printed image, when displaying the limits.

All types of visual display terminals which are available on the market and based on cathode-ray technology, liquid-crystal technology, or projection technology may be used as the color viewing screens.

Other features which are considered as characteristic for the invention are set forth in the appended claims.

Although the invention is illustrated and described herein as embodied in an operating panel for a printing machine, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the single figure of the drawing.

DESCRIPTION OF THE PREFERRED EMBODIMENT

Figure 1:
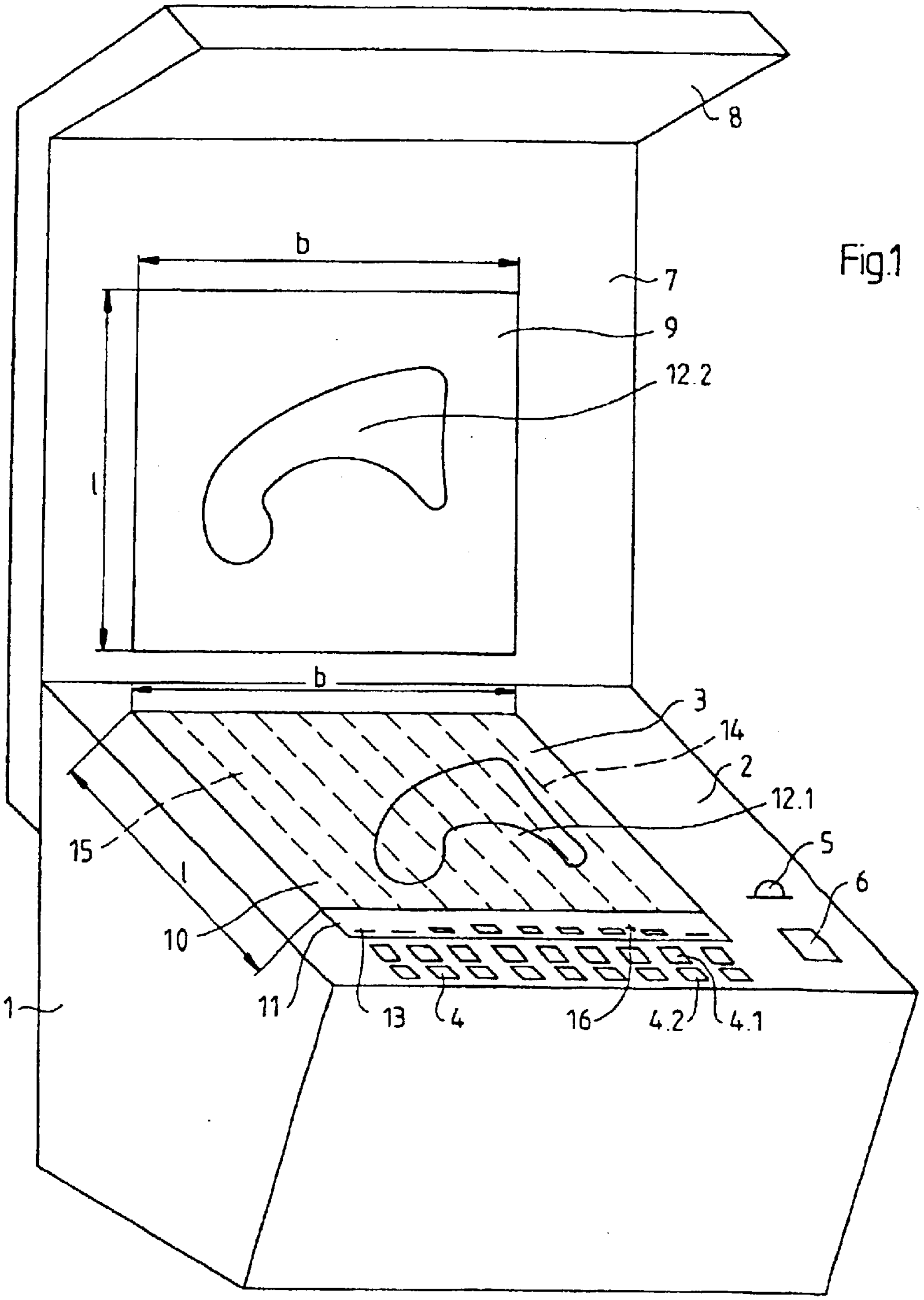
FIG. 1 is a diagrammatic perspective view of the operating panel.
Figure 2:
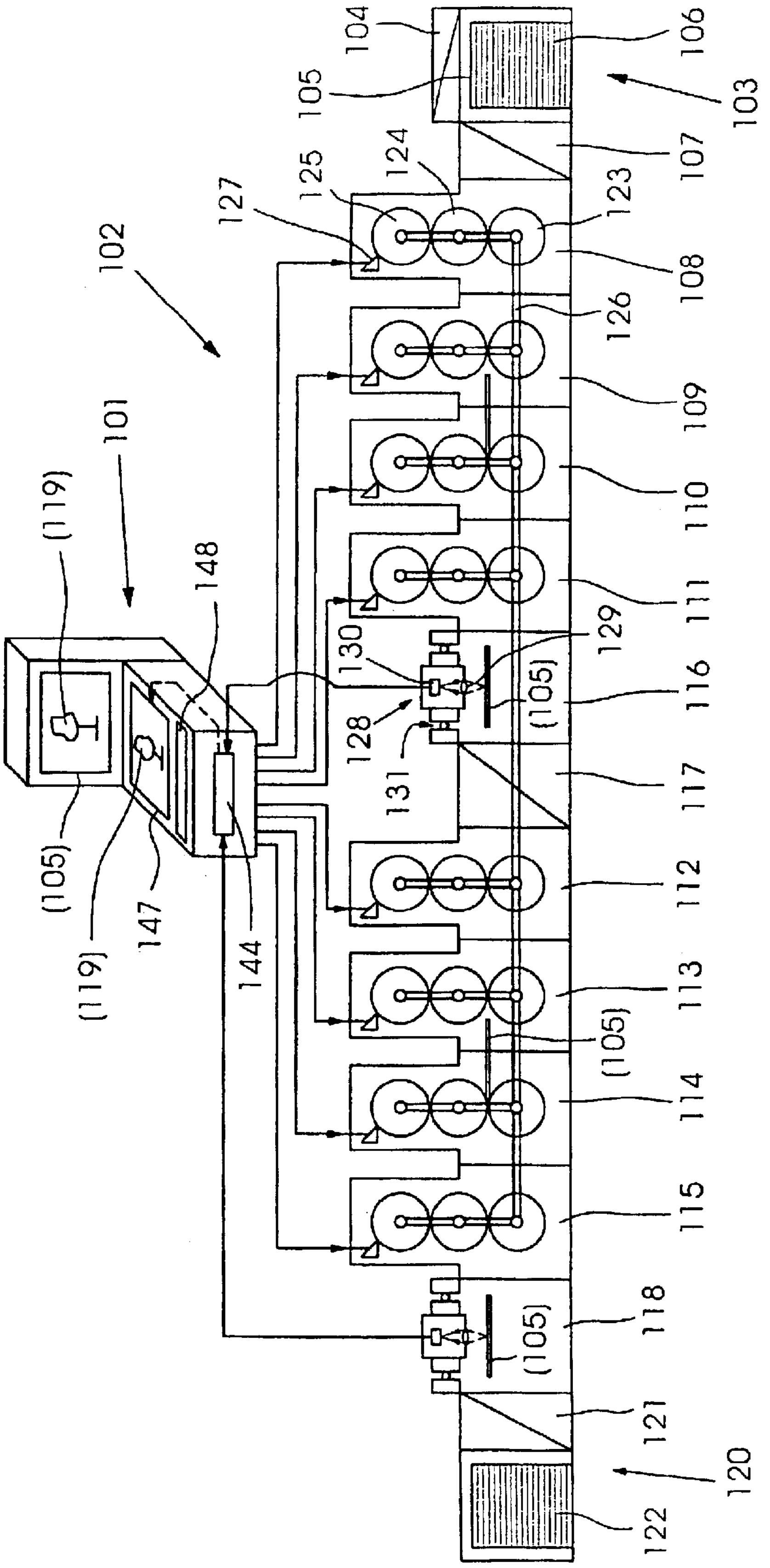
FIG. 2 is a schematic drawing illustrating the connection of a printing machine to an operating panel according to the invention.

Referring now to the figures of the drawing in detail, and first, particularly, to FIG. 1 thereof, there is shown therein a control console of a printing machine with an operating panel 1 formed of a worktable 2 with a large-sized color screen or monitor 3, ink-control keys 4, a cursor control device 5, and an acknowledgement key 6. A sheet holder 7 and an illumination device 8 for inspecting a printed sheet 9 are provided on the operating panel. The size, i.e., l×w (length times width), of the color screen 3 corresponds at least to the size (l×w) of the maximally printable sheet size or format. The color screen 3 has a display area which is divided into two windows 10 and 11, the window 10 displaying a printed image 12.1 on a scale of 1:1 and to its full extent, and the window 11 displaying the position of the ink-setting elements in the form of a bar diagram 13. A printed image 12.2 on the printed sheet 9 may represent a reference image, whereas, displayed in the window 10, is the actual printed image 12.1 produced by way of an image-recording device provided in the printing machine following the last printing unit and directed onto the sheets as the sheets pass by the image recording device, or the reverse.

The position of the ink-setting elements in the printing machine may be varied by means of the ink-control keys 4 of which the ink-control keys 4.1, which are disposed in the upper row, as viewed in FIG. 1 of the drawing, serve to increase the amount of ink supplied in the respective zone, and the ink-control keys 4.2 disposed at the bottom serve to decrease the amount of ink which is supplied. Fine lines 14 representing the limits of the ink zones 15 are shown superimposed upon the printed image 12.1 displayed in the window 10. By means of the cursor control device 5, a cursor 16 may be positioned in the window 11. With the cursor 16 being positioned at defined locations in the window 11, it is possible to introduce control functions, by means of the acknowledgment key 6, which may cause an increase and a decrease, respectively, of the amount of ink supplied to a respective ink zone 15. A non-illustrated computer accommodated in the operating panel serves for performing the respective controlling function.

The functioning of an operating panel 101 in interaction with a multicolor offset printing machine 102 is illustrated in more detail in FIGS. 2–5. The control console 101 corresponds to the control console and operating panel 1 described with reference to FIG. 1. The printing machine 102 contains a feeder 103 having a separating device 104 for sheets 105 from a stack 106, and a feed device 107 for the separated sheets 105 to printing units 108–115. The printing units 108–111 are used to overprint four colors onto the front side of the sheets 105. The printing units 112–115 are used for the four-color printing on the rear side of the sheets 105. Between the printing unit 111 and 112 there is an image recording station 116 from the front side of the sheets 105 and a turner station 117 for the sheets 105. The last printing unit 115 is followed by a further image recording station 118 for printed images 119 from the rear side of the sheets 105. The image recording station 118 is followed by a deliverer 120, which comprises a conveying device 121 for sheets 105 to a stack 122. Each printing unit 108–115 contains an impression cylinder 123, a transfer cylinder 124 and a form cylinder 125. The cylinders 123–125 of the printing units 108–115, and the printing units 108–115 are coupled to one another by a gear mechanism, which is illustrated symbolically by thin double lines 126. The printing units 108–115 also contain ink setting elements 127 which are divided up into inking zones transversely with respect to the printing direction. In each case a printing form is arranged on the form cylinders 125. By using the ink setting elements 127, the layer thickness of the printing ink on the printing forms can be set in the inking zones. The ink setting elements 127 are connected to the operating panel 101.

Figure 3:
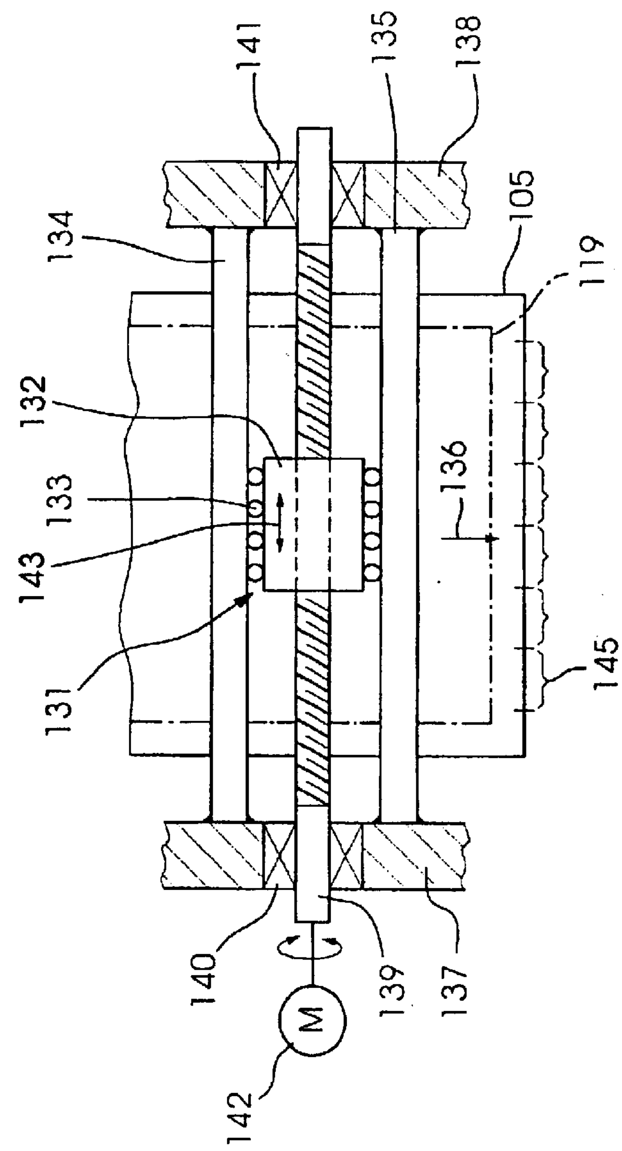
FIG. 3 is a partial plan view of an image recording device.
Figure 4:
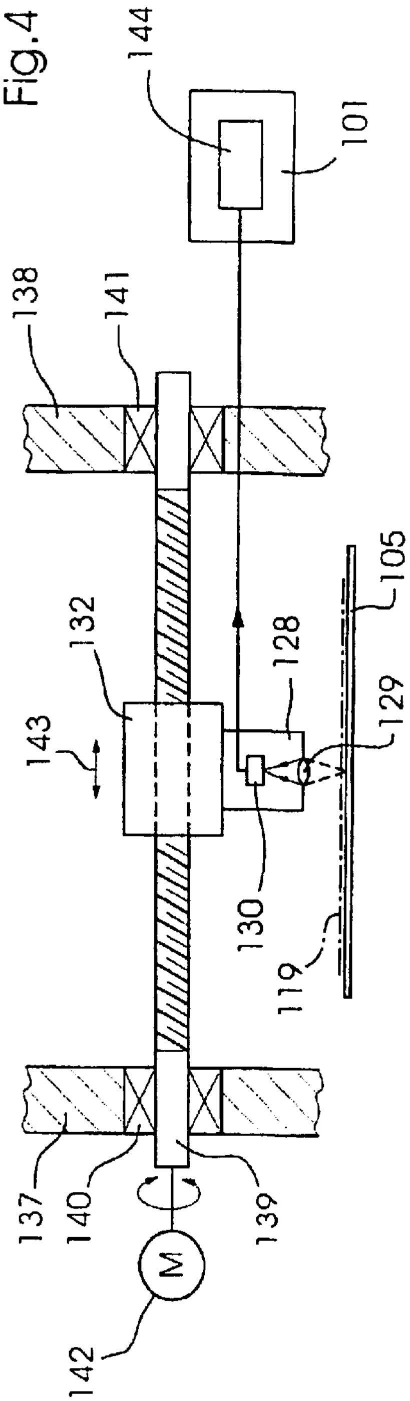
FIG. 4 is a diagrammatic side view of an image recording device.

The housing of the scanning head 128 runs in a linear guide 131, which is shown in more detail in FIGS. 3 and 4. It is possible to operate a plurality of scanning heads 128 in parallel in a linear guide 131.

The plan view in FIG. 3 shows a carriage 132, to which the scanning head 128 is fixed. The linear guides 131 comprise rolling elements 133 which are seated in guide tracks on crossmembers 134,135. The guide tracks lie at right angles to the conveying direction 136 of the sheets 105. The crossmembers 134,135 are fixed to side walls 137, 138 of the printing machine 102. On the side walls 137, 138, a spindle 139 of a screw drive is held in bearings 140, 141. The nut of the screw drive is fixed to the carriage 132. The spindle 139 is coupled to a stepping motor 142. When the spindle 139 is rotated by the stepping motor 142, the carriage 132 with the scanning head 128 moves in the direction 143 transverse to the conveying direction 136.

The side view of FIG. 4 reveals that the scanning head 128 is fixed at the bottom to the carriage 132. The converter 130 is connected to a computer 144 which is arranged in the operating panel 101. Using the objective 129, only a small area of the printed image 119, for example of one square millimeter, is registered. As the carriage 132 is displaced in the direction 143, the scanning head 128 sweeps over the inking zones 145 of the printed image 119 one after another.

Figure 5:
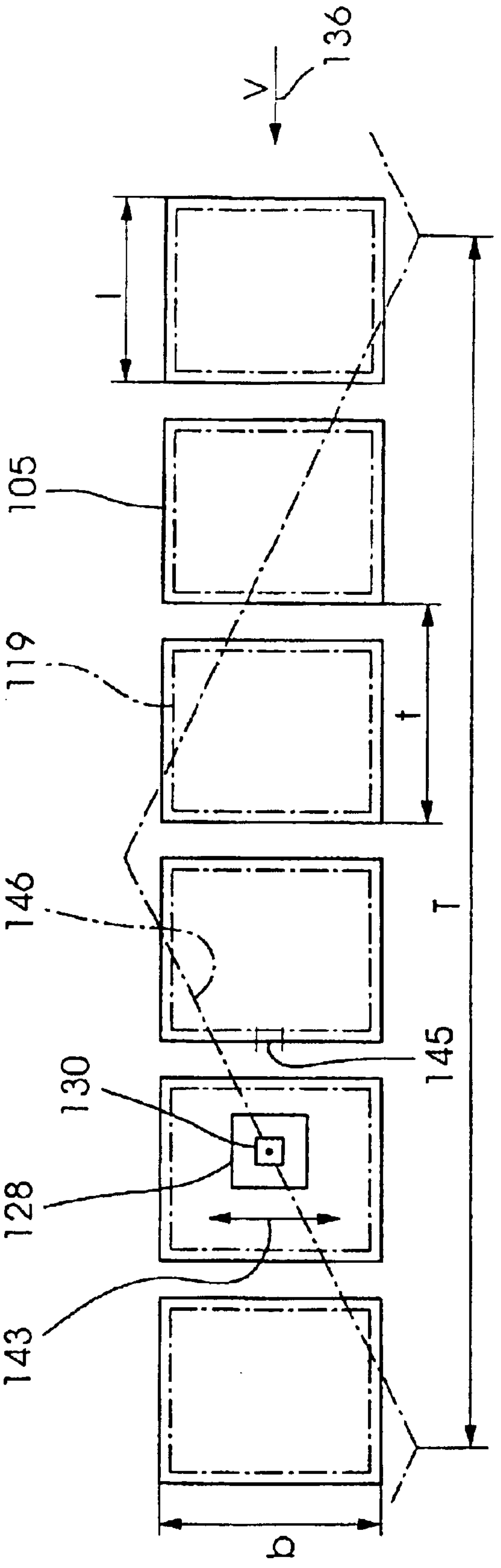
FIG. 5 is a schematic drawing relating to the scanning of sheets.

The image recording by the image recording stations 116,118 will be explained in more detail with reference to FIG. 5. The sheets 105, of width b and length l, are conveyed past the stationary scanning head 128 at a uniform speed v. The printed image 119 on the sheet 105 is an overprint of four colors. As the sheets 105 are conveyed, the scanning head 128 is positioned in the lateral direction 143 by the stepping motor 142, so that the location of the image recording is likewise displaced in the lateral direction. If the scanning head 128 is likewise moved at a uniform speed, a scanning line 146 with a periodic triangular course is produced.

The scanning line 146 sweeps over the entire width b of the sheets 105. The period T of the lateral scanning movement is substantially longer than the period t of a conveying cycle of the sheets 105. Using the scanning head 128, a number of scans can be made in one inking zone 145. The converters 130 are densitometric or colorimetric converters 130. The output signals from the converters 130 are fed to the computer 144, where a copy of the respective printed image 119 is generated separately for the front and rear side of the sheets 105. In order to generate a complete printed image 119, at least the time T/2 elapses. During the time T/2, a plurality of sheets 105 have passed the scanning head 128. The more sheets 105 are used to generate the printed image 119, the more accurate becomes the display of the printed image on a color monitor 147, which is integrated into the operating panel 101 and is connected to the computer 144. A practicable number of sheets 105 needed is 5–20 sheets 105. During the to-and-fro movement, the scanning head 128 sweeps over an inking zone 145 many times. The measured values obtained by the converter 130 at the same location of an inking zone 145 can be averaged and then displayed on the color monitor 147. On the operating panel 101 there are operating elements 148 which permit selection of the display of the printed image 119 from the front side or from the rear side 105. The operating elements 148 comprise ink control keys at the spacing of the inking zones 145 in the printed image 119. The image of a front side or rear side of the sheets 105 is arranged in such a way that the inking zones 145 in the image align with the inking control keys. The operating elements 148 lie in the plane of the color monitor, so that an operating element 148 can easily be associated visually with an inking zone 145. An operator of the printing machine 102 is able to influence the layer thickness of the printing ink in any desired inking zone 145 as desired by using the inking control keys. Following the printing of 5–20 sheets 105, a printed image 119, which has been produced on the basis of the changed layer thickness, is presented on the color monitor 147.

We claim:

1. An inking control system for a printing machine having defined ink zones and zonally acting ink distribution devices, the control system comprising:

an operating panel with operating and display elements for adjusting the zonally acting ink distribution devices in the printing machine;

a spacing distribution and a number of said operating and display elements corresponding to a spacing distribution and a number of the ink zones;

a color monitor integrated in said operating panel, said color monitor having a size configured to display a printed image on a scale of 1:1 and to a full extent thereof, and to spatially correlate a display of the printed image with regard to the inking zones with the operating and display elements, so that there is a direct visual association between the inking zones in the displayed printed image and said operating and display elements;

at least one image recording device disposed in the printing machine and aimed to record printed images while a printing material is conveyed through the printing machine; and a computer connected to the ink distribution devices and to said at least one image recording device.

2. The inking control system according to claim 1, wherein said computer is integrated in an operating console having said operating panel.

3. The inking control system according to claim 1, wherein said image recording device is movably disposed to and fro transversely with respect to a conveying direction of the printing material.

4. The inking control system according to claim 1, wherein said color monitor has a display screen arranged in a common plane with said operating and display elements.

5. A method of controlling inking in a printing machine, which comprises:

acquiring image data representing a printed image from a printing material with an image recording device disposed in the printing machine;

feeding the image data to a computer;

generating display information from the image data originating from a plurality of successively printed images and produced by the image recording device; and displaying the display information representing the printed image on a color monitor disposed in an operating panel of the printing machine, in a size corresponding to original dimensions of the printed image on the printing material.

6. The method according to claim 5, wherein the acquiring step comprises moving the image recording device to and fro transversely to a conveying direction of the printing material during a passage of a plurality of printed images by the image recording device.

7. The method according to claim 6, which comprises moving the image recording device to and fro with a period greater than a passage time of a printed image underneath the image recording device.

8. The method according to claim 5, wherein the acquiring step comprises obtaining image data with the image recording device along a scanning line over a plurality of printed images.

* * * * *